United States Patent [19]

O'Coin

[11] Patent Number: 5,468,316
[45] Date of Patent: Nov. 21, 1995

[54] METHODS OF MANUFACTURING AND INSTALLING ELASTOMERIC FILLS FOR USE IN PNEUMATIC TIRE CASINGS

[75] Inventor: Bernard J. O'Coin, Oakville, Canada

[73] Assignee: Jalcos Holdings Inc., Ontario, Canada

[21] Appl. No.: 418,771

[22] Filed: Apr. 7, 1995

Related U.S. Application Data

[63] Continuation of Ser. No. 661,133, Feb. 27, 1991, which is a continuation-in-part of Ser. No. 337,760, Apr. 13, 1989, abandoned.

[51] Int. Cl.$^6$ .................................................. B29D 30/04
[52] U.S. Cl. ........................... 156/64; 152/310; 152/315; 156/112
[58] Field of Search ............................. 156/112, 113, 156/64; 152/310, 311, 315, 316; 33/561.1, 561.2

[56] References Cited

U.S. PATENT DOCUMENTS 1,511,175  10/1924  Ribarsch .................................. 152/315

FOREIGN PATENT DOCUMENTS 268178   3/1927  United Kingdom ................... 152/315
2164903  4/1986  United Kingdom .

*Primary Examiner*—Geoffrey L. Knable
*Attorney, Agent, or Firm*—Shlesinger, Arkwright & Garvey

[57] ABSTRACT

The preferred embodiment is directed to a pneumatic tire having a plurality of layers of high density foam rubber formed therein and methods of manufacturing and installing the layers therein. The preferred method of forming the layers of fill to be inserted in the pneumatic tire casing includes the following steps. Forming an elongated strip of elastomeric material of a size sufficient to form at least two concentric layers in a predetermined size casing of a pneumatic tire at a manufacturing site. At least one dimension of the elongated strip is the same as at least one dimension of the two concentric layers when inserted in the casing. Formulating data sheet having information from which the elongated strips can be cut to form the at least two layers for at least one predetermined condition. Transporting the elongated strip of the elastomeric material and the data sheet to an installation site remote from the manufacturing site.

9 Claims, 1 Drawing Sheet

METHODS OF MANUFACTURING AND INSTALLING ELASTOMERIC FILLS FOR USE IN PNEUMATIC TIRE CASINGS

This is a continuation of application Ser. No. 07/661,133, filed Feb. 27, 1991, which is a continuation-in-part of application Ser. No. 07/337,760, filed Apr. 13, 1989, now abandoned.

FIELD OF THE INVENTION

The present invention relates to fills for pneumatic tire casings. A preferred embodiment of the present invention is directed to novel and unobvious method of manufacturing an elastomeric fill for a pneumatic tire casing and in a novel and unobvious method of fitting the fill into the casing to provide a soft-core flat-proof tire. More specifically, the preferred embodiment of the present invention contemplates extruding and molding strips of elastomer to predetermined dimensions to accommodate various sizes of tire casings. The strips of elastomer which can accommodate a variety of different tire casings are then subsequently shipped to remote locations, such as mines, to be installed into a predetermined size of tire casing as required. The elastomer can be extruded and molded into large flat sheets and shipped to the remote location where slitting machines can be employed to dimension the side edges to interfit the tire casing in increasing and decreasing widths as the tire casing dimension requires.

BACKGROUND OF THE INVENTION

It is known to provide a pneumatic tire casing with a fill to create a flat-proof assembly when fitted to a wheel of a vehicle. One common method is to assemble the tire and wheel and employ a valve to fill the cavity with a hardening material under pressure which when in place can be allowed to harden and create the fill. Once such material is urethane liquid accompanied by a hardening agent. Other polymers can be used and can be cured within the casing.

Urethane filled tires have a number of disadvantages associated therewith. Specifically, the known methods of filling urethane are performed while the tire casing is on the wheel and the curing and vulcanizing of the fill often requires a factory site. Further, urethane filled tires cannot be employed on vehicles which are to be driven at high speeds. This limitation is due to the fact that urethane tires when driven at high speeds experience heat build-up between the rubber tire casing and the urethane fill.

Furthermore, urethane is expensive and cannot be reused when the tire casing is worn out and subsequently discarded. Urethane filled tires provide a rough ride which is unacceptable to machine operators who must drive their vehicles during an entire working day. Further, filled tires have a high rolling resistance which contributes to the rough ride and results in high fuel consumption. Finally, filled tires are difficult to retread and due to the problem of casing stretching often become loose at the rim resulting in a loss of pressure.

Where solid vulcanized polymers other than urethane are used as tire fills, similar problems are encountered, especially reversion to liquid when used at high speeds resulting from the heat generated between the casing and the fill. The polymer in liquid form can leak from a loose rim or a cut or puncture in the tire casing. Low density foamed rubber is preferable, if it could maintain its strength at high speeds.

The best known of the presently used tire fill systems is the use of high density foam rubber as illustrated in U.K. Patent Application No. 2,164,903A. As is described in this patent, independent concentric rings of high density foam rubber are manufactured and installed in pneumatic tire casings. However, there are a number of disadvantages inherent in manufacturing and installing independent concentric rings in pneumatic tire casings. First, due to the vast number of different sizes and shapes of tires, it would be necessary for an installer to carry a huge inventory of rings. Further, the tooling required to produce the vast number of shapes and sizes of concentric rings is extremely expensive. Finally, forming the filler layers in concentric rings hinders their insertion into the pneumatic tire casing.

OBJECTS AND SUMMARY OF THE PRESENT INVENTION

An object of the present invention is provide a means of filling many different shapes of tires with a polymeric filler which can be easily made and inserted in large or small shops or in the field with minimal skill and equipment.

It is another object of the present invention to provide a polymeric fill for a tire casing which gives a ride comparable to a pneumatic tire but which is puncture resistant and flat-proof.

A further object of the present invention is to provide a method of manufacturing a variety of fill members that will fit different sizes of casings by extruding, molding and curing the polymer in strip form having the thickness and side edges of the fill members predetermined by the mold and then providing a cross-cutting step to create a layer suitable for insertion as one of a plurality of layers of the fill for a pneumatic tire.

Yet a further object of the present invention is to install the layers of fill such that the total volume of layers making up the fill is equal to or greater than the internal volume of the casing to allow the fill to be pressed into the casing when fitted to a wheel resulting in a tire and wheel combination having load bearing capabilities.

Still yet another object of the present invention is to provide a simple and inexpensive method of obtaining the profile of a tire casing in the relaxed and stretched states for use in forming the particular configurations of the fill layers therefor.

Still a further object of the present invention is to oversize the innermost layer, i.e. the layer adapted to be positioned adjacent the wheel-rim, by a percentage based on the percentage of air cells therein to securely fasten the tire casing to the wheel-rim.

These objects and advantages as well as others will be readily apparent from a review of the specification, the claims and the accompanying drawings.

In summary, the present invention herein disclosed contemplates the teaching of a process and method of making a reusable fill in the form of concentric layered strips of high density pressurized foam rubber for installation in a pneumatic tire casing. The preferred embodiment of the present invention includes the steps of: Extruding into a mold a sheet or strip of high density foam rubber where the mold sides are shaped to create on the molded cured strip a shape compatible with the taper of the inside of the casing wall of a tire to be filled; fitting the strips in layers into the tire casing, each of the layers being cut and dimensioned by width and length to fit in close snug abutment with its ends to itself and its sides to the casing walls and succeeding layers; spreading open the casing walls at the bead of the tire to receive the inner layers of the fill in an expanded or overfill mode; releasing the spread-open casing walls to thereby contain the concentric layers together tightly in the casing; and, forcing a wheel-rim onto the filled tire casing under pressure to create a tire-wheel combination for load-bearing road use.

DETAILED DESCRIPTION OF THE DRAWINGS

Figure 1:
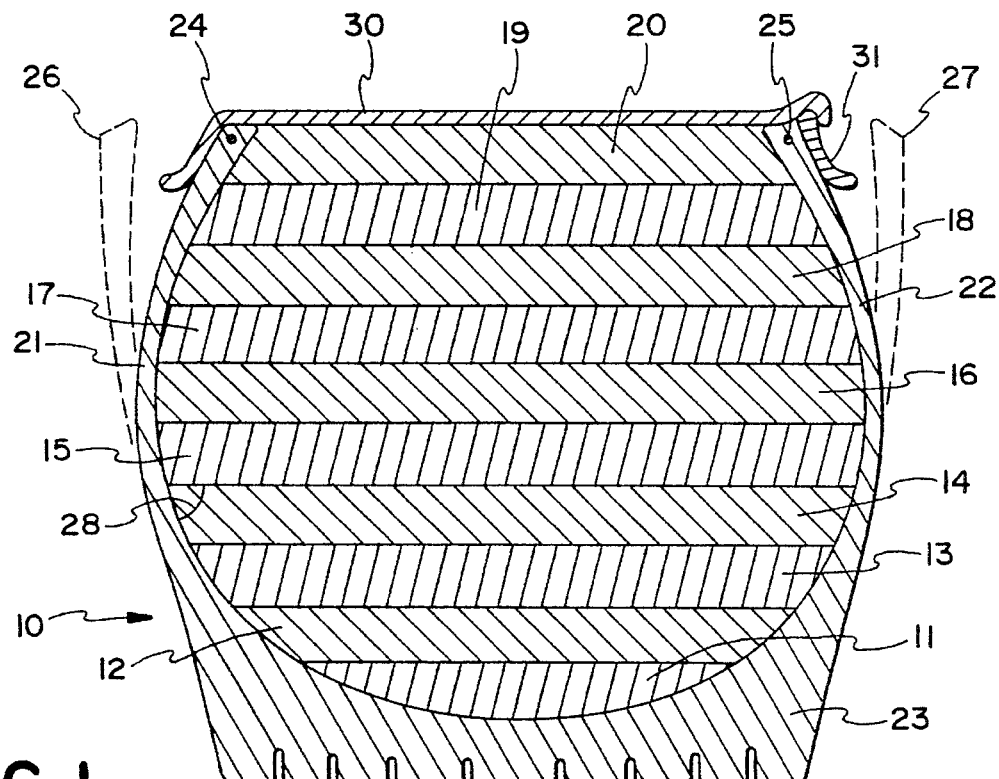

FIG. 1 is a cross sectional view of a tire casing cut from tread to bead depicting section by section the layers of fill mating one with another and tapered during molding differently by degrees along their mating edges with the casing wall. The dotted lines show the position of the walls when the casing is spread open to receive the upper or last layers which are overly wide by the predetermined amounts to obtain the required fill pressure by compression when the wheel rim is pressed over the beads.

Figure 2:
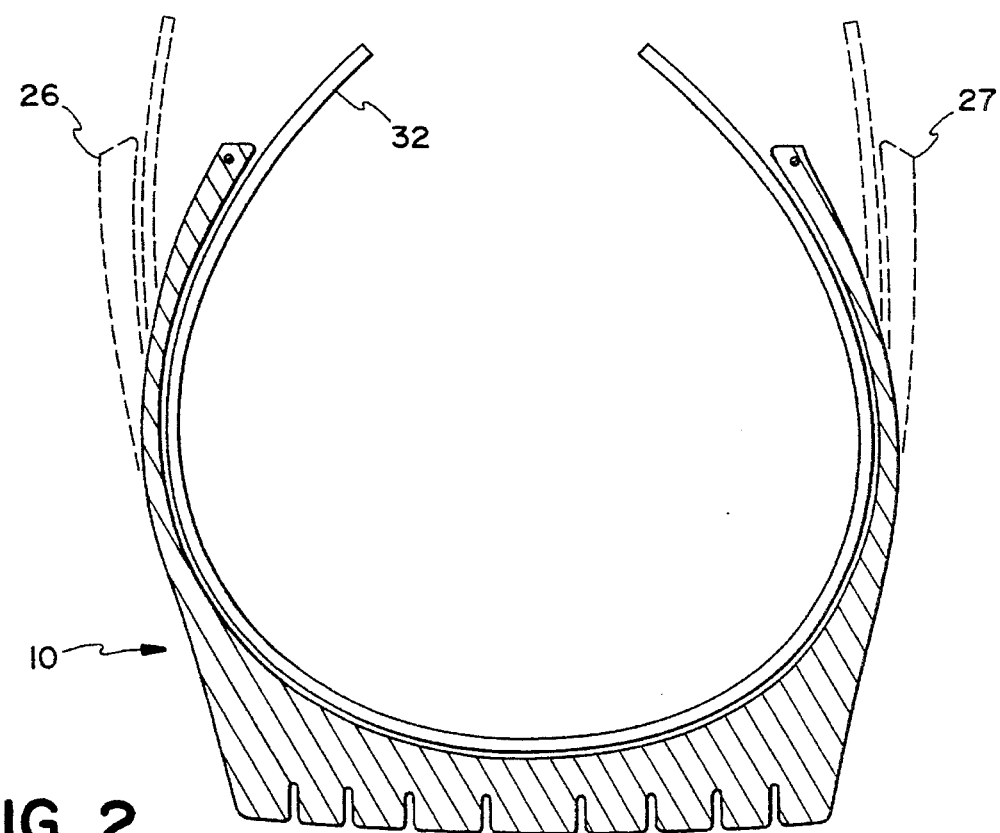

FIG. 2 is a cross-sectional view of the tire casing with the fill layers removed therefrom and a flexible material inserted therein to obtain a profile. The dotted lines depict the tire casing and flexible member in the spread state.

DETAILED DESCRIPTION OF THE INVENTION

Numeral 10 designates a pneumatic tire casing shown cut in profile to reveal the cross section of the casings walls 21 and 22, the tread area 23 and the bead portions 24 and 25. The dotted lines 26 and 27 designate the profile of the casing walls as spread open by a tire spreader to receive the layers of foam rubber. The layers are designated 11 through 20. Preferably, the thickness of the layers vary from one quarter inch to one inch. As is readily evident from FIG. 1, the width of the layers vary depending upon their particular position in the tire casing 10.

Each of the layers 11 through 20 has been designed and shaped by the flat cure mold to have a variable angle of contact 28 with the sidewalls of the casing. The manner in which the angle of contact is determined will be explained in detail below. The upper layers 14 through 20 are oversized by a predetermined amount to provide the desired pressurization of the tire casing 10 when mounted on the wheel-rim 30. With the aid of the tire press the casing 10 with its layers 11 through 20 inserted therein is pressed onto the wheel-rim 30. Subsequently, the lock ring 31 is forced over one side of the casing 10 to pack the fill layers 11 through 20 therein and to maintain the casing on the wheel-rim at the predetermined pressure.

METHOD OF MANUFACTURING AND INSTALLING THE FILL LAYERS

The preferred method of manufacturing and installing the fill layers 11 through 20 will be described hereinafter.

In order to appropriately engineer, design and manufacture the layers 11 through 20, it is necessary for the manufacturer to determine the intended uses of the soft-core, flat-proof pneumatic tire including the type of machine on which the wheels are to be mounted, the speeds at which the machine is driven, the environment in which the machine is used and other related background information.

Further, it is necessary for the manufacturer to obtain the dimensional data for the particular pneumatic tire casing. More specifically, it is beneficial for the manufacturer to obtain the profile of the interior of the casing, the inner diameter of the casing, the rim width of the wheel upon which tire casing is to be mounted, the width of the beads of the tire casing, the volume of fill material necessary to pressurize the pneumatic tire to a predetermined pressure and similar data.

The manufacturer, using the above information, can readily determine the particular type of rubber to use, the level to which the rubber is to be foamed, the specific dimensions for the layers and the number of layers to be used in a particular tire casing. The following examples will clearly illustrate the preferred method of manufacturing the layers 11 through 20.

If it is determined that the filled tire is to have an internal pressure of 100 psi, the volume of fill needed to obtain this pressure is preferably obtained as follows. The particular tire casing is pumped with water to pressurize the tire casing to 100 psi. Subsequently, the tire casing is weighed. From the weight of the tire casing and the specific gravity of the material of the fill, one can readily obtain the corresponding volume of fill which will pressurize the tire casing to 100 psi.

Subsequently, the inner diameter of the tire casing is measured in the relaxed and spread states. From the inner diameter of the tire casing, one can readily determine the length of the outermost layer 11, i.e. the layer positioned directly adjacent the tread of the tire casing. The length for the subsequent layers can be readily determined by using the value of the inner diameter and subtracting two times the total thickness of any intermediate layers. More specifically, if one is trying to determine the length of layer 13, he merely subtracts two times the combined thickness of layers 11 and 12 from the inner diameter of the tire casing 10. It is important to measure the inner diameter in both the relaxed and spread states for the following reasons. When the tire casing is spread by a spreader, the inner diameter shrinks a predetermined amount. Therefore, if the length of the layers 11 through 20 were determined in the relaxed state irrespective of the spread state, the installer may be prevented from or hampered in the installation of the layer because of the shrinkage in the inner diameter of the tire casing when spread by a tire spreader. Therefore, the length of the layer is sized to fall within a range of lengths corresponding to the spread inner diameter and the relaxed inner diameter. Accordingly, the step of measuring the inner diameter in both the relaxed and spread states facilitates the insertion of the layers therein.

The profile of the tire casing 10 is obtained in the following manner. Preferably, a flexible member 32, such as a copper wire, is inserted into the tire casing 10. Subsequently, the copper wire is deformed to conform with the interior of the tire casing 10, as seen in FIG. 2. This procedure is performed both when the tire casing is in the relaxed state (solid lines) and when the tire casing is in the spread state (dotted lines). The angle of contact 128 for each of the layers 11 through 20 is readily determined from the profile of the tire casing in the relaxed state. Thus, the precise manner in which to orient the side edges of the mold to form the desired angles in the side edge of the layers 11 through 20 can be readily determined.

The profile of the tire casing in the spread state provides the manufacturer with a maximum width for the layers 11 through 20. More specifically, it is desirable to make sure that the width for any particular layer does not exceed the width of the corresponding section of the profile taken in the spread state.

The manner for determining the specific width of layer 20 will be described hereinafter. The distance-between the sidewalls of the tire casing in the relaxed state can be readily determined by subtracting the width of beads 24 and 25 from the width of the wheel-rim 30. For example, if the width of the wheel rim is 6.5 inches and the combined thickness of beads 24 and 25 is one inch, the distance between the inner walls of the tire casing at the uppermost point thereof is approximately 5.5 inches. If the upper surface of layer 20 is provided with a width of 5.5 inches and sides edges are angled to conform to the profile of the tire in the relaxed state, the layer 20 would not experience any compression loads when the tire casing 10 is mounted on the wheel-rim 30. It is desirable to place the layer 20 under compression loads to provide a force fit between the beads 24 and 25 and the wheel-rim 30.

However, if the layer 20 is placed under excessive compression loads, the percentage of air cells therein will be negligible. This is undesirable because the advantages of a soft-core are lost. Moreover, excess compression will cause the layer 20 to buckle toward the tire tread 23 resulting in the side edges losing contact with the inner walls of the tire casing 10.

To avoid these undesirable results, the layer 20 is oversized such that when inserted into the tire casing 10 and mounted on the wheel-rim 30 it will not be compressed a percentage which exceeds the percentage of air cells therein. The percentage of air cells in the layers 11 through 20 varies depending upon the use of the pneumatic tire into which they are to be inserted. Specifically, if the tire is to be placed under heavy loads the percentage of air cells is kept to a minimum. However, if the tires are not placed under heavy loads, the percentage of air cells is increased. Preferably, the percentage of air cells in the layers 11–20 ranges from approximately 5% to approximately 40%.

If the tire casing 10 is to be placed under heavy loads, the layer 20 is preferably formed such that it contains approximately 15% air cells and approximately 85% rubber. Thus, the layer 20 is not to be oversized such that it will be compressed greater than approximately 15% of its volume. If such compression were to occur, the layer would no longer have any air cells therein and would be merely a solid fill rather than a soft fill. Preferably, the layer 20 is oversized such that the percentage of compression of the layer does not exceed 75% of the percentage of air cells therein. The layers 14 through 19 are oversized by an amount such that when the total volume of the layers 11 through 20 is compiled, it equals the volume required to pressurize the tire casing 10 to the desired amount. In a number of instances, the layers 14 through 19 are compressed by a percentage less than the percentage of the compression of layer 20. However, the layers 14 through 19 are not to be oversized by an amount which would cause the layers to be compressed by a percentage exceeding the percentage of air cells therein.

With the above information, one can readily determine the number of layers and the configuration of each layer to be inserted into a particular type of tire casing. Preferably, the manufacturer forms large sheets of foam rubber at a site remote from the installation site. The large sheets may be formed such that the width thereof corresponds to the width of a particular layer when installed. Moreover, the sides of the sheet may be oriented to correspond to the angle of contact 28 for a particular layer. The large sheet is provided with a length which will permit an individual to cut the same along its transverse axis to form a number of sections which have the desired dimensions for a concentric layer in a predetermined size tire casing.

Alternatively, the large sheet may be formed with a width sufficient to permit the sheet to be cut along its longitudinal axis to form a plurality of sections which have the desired dimensions for concentric layers. The large sheet is cut such that the desired angle is formed in the side edges of the sections. These are only two of the many ways in which the large sheet may be formed so that it has a sufficient size to form a plurality of fill layers.

The manufacturer supplies the installer with data sheets informing the installer of the number of layers and specific dimensions thereof to be inserted into a particular size tire casing. The data sheets are compiled from the information obtained above. Samples of the tire data sheets are listed below.

EXAMPLE A

TIRE SIZE 825 × 15
RIM = 6.5" BEAD = 1"
P.S.I.: 100 WATER WEIGHT 147          5% COMPRESSION

| MOLD ANGLE | THICKNESS | TOTAL WIDTH | TOTAL LENGTH |
| --- | --- | --- | --- |
| 25 | 1 in. Thick × | 6.5 in. Wide × | 88.965 inches |
| 55 | 1 in. Thick × | 9.5 in. Wide × | 82.074 inches |
| 72 | 1 in. Thick × | 10 in. Wide × | 75.79 inches |
| 90 | 1 in. Thick × | 10 in. Wide × | 69.115 inches |
| 104 | 1 in. Thick × | 10 in. Wide × | 62.439 inches |
| 132 | 1 in. Thick × | 9 in. Wide × | 55.763 inches |
| 112 | 1 in. Thick × | 7 in. Wide × | 49.48 inches |

EXAMPLE B

TIRE SIZE 825 × 15
RIM = 6.5" BEAD = 1"
P.S.I.: 75 WATER WEIGHT 140          5% COMPRESSION

| MOLD ANGLE | THICKNESS | TOTAL WIDTH | TOTAL LENGTH |
| --- | --- | --- | --- |
| 25 | 1 in. Thick × | 6.5 in. Wide × | 88.965 inches |
| 55 | 1 in. Thick × | 9 in. Wide × | 82.074 inches |
| 72 | 1 in. Thick × | 9.5 in. Wide × | 75.79 inches |
| 90 | 1 in. Thick × | 9.5 in. Wide × | 69.115 inches |

| -continued | | | |
|---|---|---|---|
| 104 | 1 in. Thick × | 9.5 in. Wide × | 62.439 inches |
| 132 | 1 in. Thick × | 8.5 in. Wide × | 55.763 inches |
| 112 | 1 in. Thick × | 6.5 in. Wide × | 49.48 inches |

Examples A and B illustrate the fill for the same size tire casing but under different internal pressures. Specifically, Example A refers to a tire casing placed under 100 psi while Example B refers to the same tire casing placed under 75 psi. The only difference in Examples A and B is that the width of some of the layers in Example B is less than that of Example A. Accordingly, the volume of the fill in Example B is less than that for Example A. With this information an installer, at a site remote from the manufacturing site, can readily form the fill layers for the above-identified tire size at 75 psi and 100 psi. It will be readily appreciated that the data sheets for differently sized and pressurized tires are formed in the same manner.

Once the installer has cut the large sheet to form the appropriate number of layers, the tire casing is spread by a tire spreader. Subsequently, each of the layers is inserted into the tire casing. A tire press is used to secure the tire casing to the wheel rim.

While this invention has been described as having a preferred design, it is understood that it is capable of further modifications, uses and/or adaptions of the invention following in general the principle of the invention including such departures from the present disclosure as come within the known or customary practice in the art to which the invention pertains, and as may be applied to the central features set forth and fall within the scope of the invention and the limits of the appended claims.

I claim:

1. A method of forming a fill to be inserted in casings for pneumatic tires, comprising the steps of:
   a) obtaining at least a first profile of the interior of a predetermined size casing for pneumatic tires;
   b) determining at least one angle of contact between at least one strip of a fill and a sidewall of the casing from the profile;
   c) said step of obtaining at least a first profile includes:
      i) inserting a first time a flexible member into the casing of a tire; and,
      ii) deforming the flexible member to conform to the interior of the casing to obtain the first profile thereof;
   d) performing said first insertion step when the tire casing is in a relaxed state;
   e) spreading the tire casing;
   f) inserting a second time the flexible member in the tire casing subsequent to said spreading step;
   g) deforming the flexible member to conform to the interior of the casing to obtain a second profile;
   h) using the second profile in determining width of the at least one strip of fill;
   i) forming the at least one strip of fill from an elastomeric material, the at least one strip of fill having first and second sides; and,
   j) orienting at least one of the first and second sides at an angle corresponding to the at least one angle of contact.

2. A method as defined in claim 1, further comprising the steps of:
   a) determining a first time an inner diameter of the tire casing in the relaxed state;
   b) spreading the tire casing;
   c) determining a second time an inner diameter of the tire casing when the tire casing is spread; and,
   d) determining a length of the at least one strip of fill using the inner diameters obtained at the first second times.

3. A method of forming a fill to be inserted in casings for pneumatic tires, comprising the steps of:
   a) obtaining at least a first profile of the interior of a predetermined size casing for pneumatic tires;
   b) determining at least one angle of contact between at least one strip of a fill and a sidewall of the casing from the profile;
   c) determining a first time an inner diameter of the tire casing in the relaxed state;
   d) spreading the tire casing;
   e) determining a second time an inner diameter of the tire casing when the tire casing is spread;
   f) determining a length of the at least one strip of fill using the inner diameters obtained at the first and second times;
   g) forming the at least one strip of fill from an elastomeric material, the at least one strip of fill having first and second sides; and,
   h) orienting at least one of the first and second sides at an angle corresponding to the at least one angle of contact.

4. A method as in claim 3, wherein:
   a) said step of obtaining at least a first profile includes:
      i) inserting a first time a flexible member into the casing of a tire; and,
      ii) deforming the flexible member to conform to the interior of the casing to obtain the first profile thereof.

5. A method as in claim 4, further including the step of:
   a) performing said first insertion step when the tire casing is in a relaxed state.

6. A method as in claim 5, further including the steps of:
   a) spreading the tire casing;
   b) inserting a second time the flexible member in the tire casing subsequent to said spreading step;
   c) deforming the flexible member to conform to the interior of the casing to obtain a second profile; and
   d) using the second profile in determining width of the at least one strip of fill.

7. A method of forming and installing a fill in casings for pneumatic tires, comprising the steps of:
   a) inserting a first time a flexible member into a predetermined size casing for a pneumatic tire when the tire casing is in a relaxed state;
   b) deforming the flexible member to conform to the interior of the casing to obtain a first profile thereof;
   c) spreading the tire casing;
   d) inserting a second time the flexible member in the tire casing subsequent to said spreading step;
   e) deforming the flexible member to conform to the interior of the casing to obtain a second profile thereof;

f) forming an elongated strip of elastomeric material of a size sufficient to form at least two concentric layers in a predetermined size casing of a pneumatic tire when cut, at least one dimension of the elongated strip corresponding to a desired dimension for the two concentric layers when inserted in the predetermined size casing;

g) formulating a data sheet having information from which the elongated strip can be cut to form the at least two layers for at least one predetermined condition; the data sheet including indicia identifying the angle of orientation of at least one side of each of the two concentric layers derived from the first profile, the data sheet further including indicia identifying the maximum width for each of the at least two concentric layers derived from the second profile;

h) cutting the elongated strip of elastomeric material based on the data sheet to form at least two concentric layers for the predetermined size casing; and, i) installing the two concentric layers in a pneumatic tire casing.

8. A method as in claim 7, wherein:

a) the elongated strip is formed at a manufacturing site; and, b) the two concentric layers are installed in the pneumatic tire casing at an installation site remote from the manufacturing site.

9. A method as in claim 7, further including the step of:

a) providing the elongated strip of elastomeric material with the same width and thickness as the two concentric layers when inserted in the casing prior to said cutting step.

* * * * *